Dec. 22, 1936. J. BIJUR 2,064,877
CHASSIS LUBRICATION
Original Filed Feb. 28, 1924 3 Sheets-Sheet 2

Inventor:
Joseph Bijur, deceased,
by G. Bijur, Executor;
by
Attorneys.

Dec. 22, 1936. J. BIJUR 2,064,877
CHASSIS LUBRICATION
Original Filed Feb. 28, 1924   3 Sheets-Sheet 3

Inventor:
Joseph Bijur, deceased,
by G. Bijur, Executor;
by Dean Fairbank [illegible]
Attorneys.

Patented Dec. 22, 1936

2,064,877

UNITED STATES PATENT OFFICE 2,064,877

CHASSIS LUBRICATION

Joseph Bijur, deceased, late of New York, N. Y., by George Bijur, executor, New York, N. Y., assignor to Auto Research Corporation, a corporation of Delaware Original application February 28, 1924, Serial No. 695,746, Patent No. 1,845,827, February 16, 1932. Divided and this application January 27, 1932, Serial No. 589,287. In Great Britain April 30, 1924

11 Claims. (Cl. 184—7)

The present invention relates broadly to remote-control fluid distribution and is concerned in certain preferred applications with systems, methods, installations and the constituent elements thereof for lubricating a multiplicity of bearings on a machine, a group of machines, or mechanical installations generally from a readily accessible point of control.

The invention relates especially to lubricating installations of the type in which lubricant pressure is transmitted from a pressure source, such as a pump, through a system of lubricant-filled piping, concurrently to various distributed outlets therein, which communicate with the bearings. The invention is shown exemplified in a preferred application to the lubrication of all or most of the bearings on the chassis of a vehicle, such as an automobile or a motor truck.

It is an object of the invention to provide a system of the above type, devoid of oil cups, grease cups or other bulky fittings, which shall be easily and reliably operable, to deliver predetermined charges or predetermined percentages of a charge of oil from a reservoir, simultaneously to a multiplicity of distributed bearings, by a single simple non-selective operation.

Another object is to accomplish the result last stated without substantial increase in the cost, complexity or bulk of the system, and without loss or impairment of any of the other advantages that may inhere in the system.

Another object is to provide a system of the type referred to, in which a maximum number of bearings may be simultaneously lubricated, substantially unfailingly, and with a minimum number of flow controlling devices or fittings.

Another object is to provide an installation of the type referred to in which the troublesome operation of cleaning fittings and the like, to maintain the system in operation, is eliminated, and in which an injured fitting can be easily removed and replaced without loss of oil and without the possibility of deranging the installation.

Another object is to provide a system of the type mentioned, the operativeness of which as a whole, will not be impaired, even if a localized area of the pipe line be destroyed and in which a destroyed length of pipe can be easily replaced without the need for first draining the system of oil.

In the preferred method and apparatus for carrying out the above and other objects, the lubricating oil is forced through metal pipes of small diameter, to the bearings or to groups of bearings in parallel by pressure applied at one point of control. Each line is normally kept filled by appropriate check valves preferably at or near the bearings, said valves operating under applied pressure to deliver oil to the bearings.

It is found that the check valves will close positively when seated by springs that retract under about 5 pounds of oil-pressure to permit flow. To avoid exacting requirements of manufacture, a variation of one or even two pounds each way should be allowed, so that a normal valve might open anywhere between say 3 and 7 pounds. Such irregularities in the seating pressures of the check valves, however, and differences in the lengths of pipe line connecting them, with the source of pressure may result in relief of pressure at a valve having a weaker spring, particularly if such valves should be near the source of pressure, so that the corresponding bearing would receive an excess of oil at the expense of other bearings, some of which might receive too little oil.

To obviate this defect, there is interposed according to the invention, in the path of the flow to each bearing and in the vicinity thereof, a pressure-absorbing or seepage resistance, which substantially determines the rate of oil flow past the corresponding check valve.

A desirable type of seepage resistance, preferred in many applications, is of metal or other non-porous material, affording one or more minute crevices for the passage of the oil from the line. A satisfactory element includes a small-bore tube, plugged with a rod or wire, a few thousandths of an inch smaller in diameter, providing a minute crevice, annular in cross-section, through which the oil passes slowly to the bearing when sufficient pressure is applied. The seepage resistance or obstruction and the associated valve are preferably located in the interior of a pipe fitting, which is called a "drip plug" which may be screwed in lieu of an oil cup into a part to be lubricated. The outlet crevice of each drip plug is restricted to such extent as to offer an obstruction to flow of lubricant several times greater than the resistance to flow encountered in the length of the pipes, added to that imposed by the valves and to that encountered in the bearings.

When a high pressure like 30 to 50 pounds exists in the line and particularly at the drip plugs, the latter would thus be a determining factor in the flow to each bearing, substantially regardless of substantial differences in the lengths of the courses from the pump to the various drip plugs, or in the tightness or looseness of the corresponding bearings, or of substantial variations in the seating pressures of the valves, which would open substantially concurrently upon application of the pressure.

Not so in the case of low oil pressures, like five pounds, which would result in great inequalities in the flow from the drip plugs, as those nearest the pump outlet or having the lightest valve springs would open first and permit the oil to escape and perhaps prevent the pressure building up at all to the point where the stiffer or more remote valves would operate, whereby the distribution would be faulty.

To assure reliable distribution at all times in a system of the type considered, it is, therefore, desirable to apply the high pressure to the line initially at each operation and to substantially maintain it during operation. A spring discharged pump would be suitable for this purpose, provided too much of the energy is not wasted within the pump, and provided the pressure transmitting agency intervening between the pump and the outlets is substantially incompressible at all times. Only in this case would the discharge pressure of the pump promptly raise the line pressure to maximum, for concurrent opening of all the valves and for correct distribution through the drip plugs of an oil charge equal to that forced into the line by the pump.

All of the foregoing objects and features of construction which are of more or less general application, are exemplified in chassis lubrication in the present lubrication and specifically in lubricating from a single source all or most of the bearings on the frame, and those at the axles of the motor vehicle, but of course these systems may be utilized to lubricate other machinery than automobile chassis.

In this application the pump is mounted at a convenient place on the chassis frame, and main conduits may extend along the sides of the frame, with taps each provided with a drip plug from which the various parts carried on the frame, such as the spring shackles and the steering gear are supplied in parallel with lubricant, said piping having, moreover, one or more conduits or taps also provided with drip plugs and extending to the bearings on the unsprung parts or axles, for instance, to the king pin, the tie rod clevises and the brake linkage, and to other parts movable with respect to the frame.

It is among the objects of the invention to provide for a vehicle installation, a serviceable conduit of small diameter and low cost, which is easy to install on any of a wide variety of vehicles, regardless what the construction or type of frame or springs, which provides the required yield or flexibility where flexure should occur, yet is not subject to whipping, which remains tight even for relatively high fluid pressure, and which is substantially proof against rupture or leak from vibration of the moving vehicle even in hard usage.

The conduit element through which fluid or pressure is transmitted between the chassis frame and the axle should accommodate relative movement of these parts, which occurs as the springs flex during travel of the vehicle, and this relative movement is of greater range than that between other parts of the installation.

Among other objects of the invention are to provide a conduit in the above relation, which has no exposed unprotected parts likely to be bent or broken off by the usual impacts encountered in ordinary usage, which is inconspicuous and which, while accommodating without undue strain at any part of the conduit, the relative motion between the frame and the axle, or between other elements of the structure, is nevertheless mechanically so strong and is retained in place upon the vehicle structure so securely as not to be torn loose by the driving of the vehicle through brush or bushes, which will suffer no substantial injury from pelting by ice or loose stones that may be thrown up from the road by the movement of the vehicle thereon, which will not be torn off or damaged by mud frozen thereonto, and which will not be disturbed by handling as by removing mud in cleaning the vehicle.

Because of the high resistance of the drip plugs, the rate of flow through the mains is very slow, hence pipes of extraordinarily small bore may be used to convey the oil, without objectionable loss of head. Such piping is inexpensive and can easily be formed to follow around obstructions on the frame and to provide the flexibility for the yielding branches by coiling preferably into a helix, serving as a hollow coil spring to accommodate angular or longitudinal motion. The pipe being light has low inertia compared to its strength and may bridge unsupported through the air for a foot or more from the frame to an unsprung part of the chassis, without whipping, or may extend lengthwise and be detachably clamped to a vehicle spring or to some other structural part connecting the frame and the axle, leaving only a short hinging or bridging portion unsupported between its ends. Thus, he provides a continuous oil-tight seamless metal duct from the frame to the axles, to sustain the oil pressure and eliminates the likelihood of leakage incurred in a conduit of so-called flexible hose, or in swiveling joints under pressure.

Where two or more bearings on the installation are associated, it is preferable to provide lubricant therefor through a single drip plug, which preferably delivers to the uppermost of said bearings, the structure being provided with one or more ducts that lead the lubricant seriatim to the bearings.

In the accompanying drawings in which are shown one or more of various possible embodiments of the several features of the invention, Fig. 1 is a diagrammatic view showing the application and construction of various forms of drip plugs.

Figure 1:
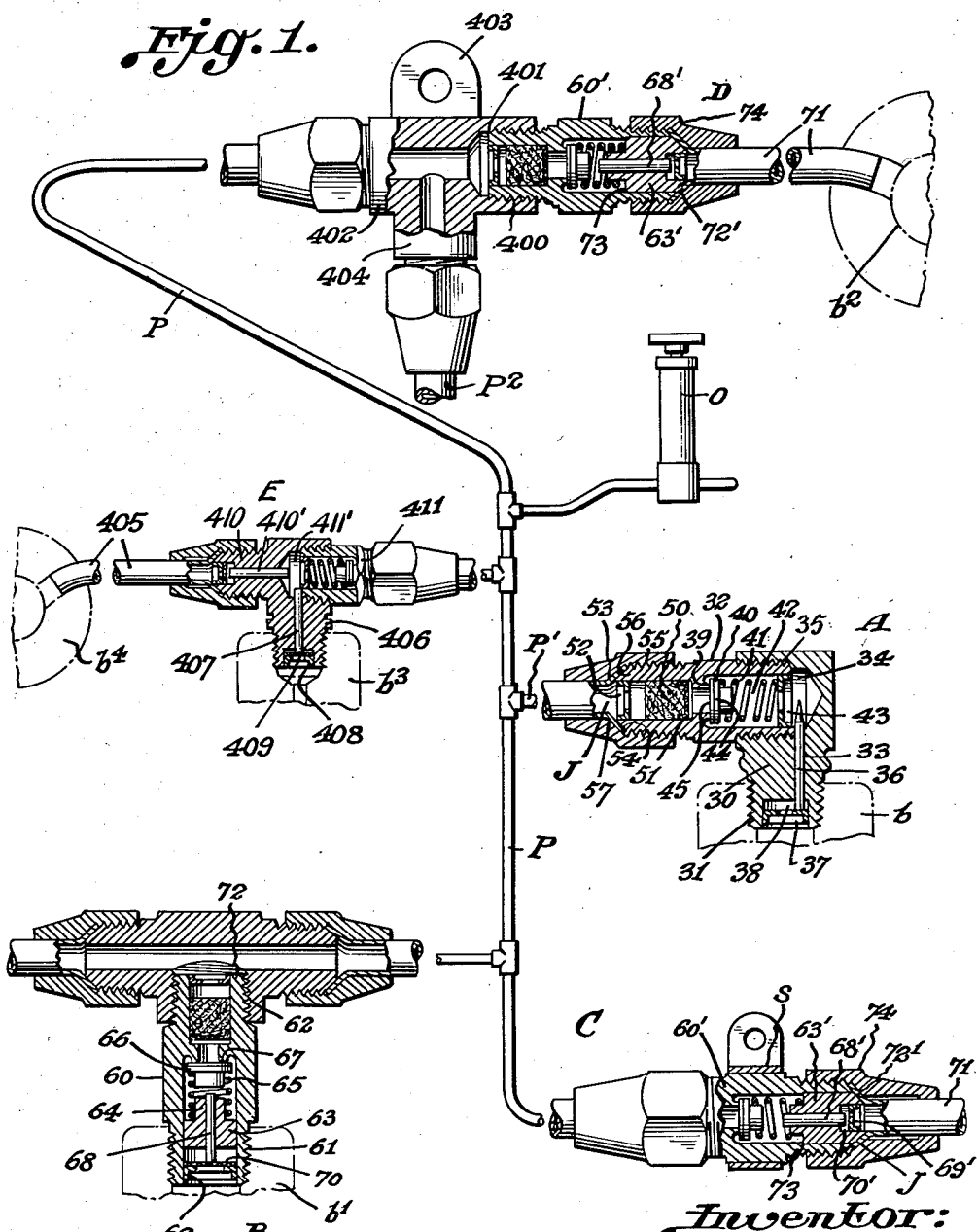

Referring now to Fig. 1, he has shown a centralized lubricating system, the distributing piping P of which includes branches P', shown merely diagrammatically to suggest a conduit arrangement for supplying a multiplicity of distributed bearings of a mechanism or system of mechanisms, such as a factory installation. A single suitable source of oil pressure is indicated diagrammatically at O and serves, when actuated or in operation, to place the entire piping under pressure, substantially sustained at or in advance of each bearing by a highly restricted pressure absorbing outlet in the pipe. The exit of the oil to the bearings will thus be at a slow predetermined rate which depends on the pressure at the source and is largely determined at each outlet by the resistance thereat.

*The drip plug construction*

The highly restricted outlets are embodied in pipe fittings, which are called "drip plug fittings", special types of which are shown in Fig. 1, and on an enlarged scale at A, B, C, D and E. Each type of fitting is primarily intended to be used in a definite relation, as will appear below.

To prevent slow draining of the pipe line while the pressure source is idle, which draining might occur by entry of air at a drip plug at relatively high level, and escape of oil through one or more drip plug fittings at lower level, it is desirable to provide a relief valve at or in association with each said fitting.

At A is shown a drip plug fitting of elbow form, having more or less general application, and shown supplied from the end of a branch pipe P'. The drip plug has a stem illustratively shown threaded by pipe thread 31 into a bearing b in lieu of an oil or grease cup. A relief valve cartridge 32 is threaded by pipe thread connection 35 into a corresponding transverse well 34 in the plug 30.

The plug-fitting 30 has a longitudinal circular bore 33 therein of approximately $\frac{1}{16}$ inch in diameter extending from near the base of well 34 and therefore eccentric of the fitting so as to afford a substantial length of thread 35 for secure hold of the valve fitting 32. Bore 33 is plugged with a length of metal wire or pin 36 of diameter only in the order of .002 inch smaller than the bore to leave but a minute annular crevice about ½ inch long for exit of the lubricant. The pin is maintained in place by a metal cup 37, press-fitted into a socket 38 in the base of the plug 30, and is provided preferably with a central hole through which the lubricant passes.

The cross-sectional area of the annular crevice, though minute, can be made uniform within very fine limits, since it is the differential between the cross-section of a bore and a wire plug, both of appreciable dimensions and both of which can be easily formed accurately. Greater difficulty would be encountered in forming accurately a minute aperture to provide the necessary resistance to flow, and such aperture would, moreover, be more easily clogged by a minute solid particle, than the preferred annular crevice.

The relief valve cartridge unit 32 is formed with an integral valve seat 39, against which the disk relief valve 40 is pressed by a coil spring 41, within the bore 42 of the fitting, said spring reacting against a perforated metal cup 43, press-fitted into the inner end of the cartridge 32. In advance of the valve 32 is plugged a wad 50 of felt which serves as a strainer to intercept any chips that may be picked up by the oil. The wad is backed by a cup 51 of fine metal mesh, the latter to prevent any minute fibers from the felt passing to the valve seat 39. The felt is maintained in place against escape from the cartridge by a press-fitted perforated cap 52 at the inlet end thereof.

To assure effective seating of the relief valve, the valve seat is preferably highly burnished and the seating surface of the valve is provided with a seating facing 44 of a material yielding to compensate for possible irregularities in the seat, smooth, to seat completely under light pressure, substantially impervious and chemically inert to oil and nonsticking. In one type of construction, the seating portion comprises an oil-proof yielding backing with a smooth oil-proof, pliable and non-sticking facing to engage the valve seat. The backing may be smooth cork, or oil-proof rubber compound, one commercial form of which is known as "Hippohyde", varnished cambric, or any oil-proof gasket material. The facing may be metal foil, animal membrane, sheet celluloid, non-porous leather or leather substitute, or oil paper, linen or silk. In the drawings, the rigid valve disk has secured thereto, the yielding backing layer 44 as of varnished cambric covered with the facing 45 as of oil paper. If oiled or varnished cambric, paper, linen or silk is treated in any of the known methods to avoid the sticky surfaces, it may be used in lieu of the two-ply backing and facing construction just described, but the latter is preferred.

The elbow drip plug fitting A described, serves more particularly as a terminal fitting, that is, a fitting connected to the extreme end of a pressure line, said fitting delivering through the restriction pin thereof, the entire discharge therethrough to the bearing at which the fitting is applied. He has accordingly designated the fitting "terminal drip plug." The preferred coupling J between the lubricant delivery pipe and the drip plug fitting is formed by flaring as at 53, the end of the pipe which may be of copper or other soft metal. The flared pipe end fits against the correspondingly beveled rim 56 of the cartridge 32 and is clamped thereagainst by the correspondingly sloping shoulder 57 of a nut 54 encircling the pipe end and threaded at 55 onto cartridge 32.

At B is shown a drip plug fitting similar in general principle to that described, but formed in a straight line rather than of elbow formation, as fitting A. This type of drip plug has a particular field of application in association with a complementary pipe fitting, to feed lubricant to a bearing, substantially in the run of a line rather than at the terminal or end of the line, and he has accordingly designated it "line drip plug." In the application shown, the line drip plug comprises the pipe fitting 60, which has a pipe thread 61 at its outlet, to be applied in the bearing b', and a similar pipe thread 62 at its inlet end, shown applied in a tubular pipe connecting fitting in the run of the line. The line drip plug fitting 60 in this embodiment has a plug 63 press-fitted thereinto, with a hub extension 64 encircled by spring 65 that urges valve 66 against its seat 67. The restriction wire or pin 68 fits in an axial bore in plug 63 and is retained against falling out of the fitting by a perforated press-fitted cap 69, backed by a sheet 70 of fine wire mesh. It will be seen that when pressure is applied at the source, the line drip plug will feed lubricant at the predetermined rate to the associated bearing, while the main charge is passed on through the length of the line which is tapped by said line drip plug. Other features of construction and of the operation of the line drip plug B will be apparent from the description of the terminal drip plug A. As indicated at 72 the drip plug when inserted into the head or cap will not block the bore therethrough.

Where there is insufficient room to affix at the bearing, the drip plug to supply the same, it may be preferred to employ the arrangement of fitting shown at C in Fig. 1, connecting such fitting to the bearing (not shown) through an intervening length of pipe 71. For this purpose, he provided a drip plug fitting of the straight formation shown at B rather than of the elbow formation shown at A, said drip-plug C in the length of the line and attached to the supporting structure as by a strap or staple S. As the outlet end of the small diameter fitting B has a pipe thread, and an insufficient thickness of wall for the bevel to effect a coupling connection of the type shown at J with the flared pipe end, the construction shown at C is modified somewhat, as shown, with respect to that at B, similar parts having corresponding reference numerals primed however. In the fitting C, the plug 63' is seated against a shoulder 73 in the bore of pipe fitting 60', and protrudes from said fitting, the desired bevel 72' for the pipe being formed in part on the thin fitting wall, and in part on plug 63'. The restriction wire or pin 68' is kept from falling out of its bore by a cap 69' press-fitted into a corresponding socket 70' in plug 63' and having an eccentric outlet aperture.

As indicated at J in fitting C of Fig. 1, the end of the pipe 71 is flared so as to contact closely with the bevel at the outlet end of the drip plug C and the nut, as shown, is slipped onto the pipe either before flaring or from the other end thereof and when it is tightened upon the threaded end of the drip plug will clamp the flared end of the pipe in lubricant-tight relation with respect to the drip plug body. The ring S may be utilized to hold the drip plug body 60', said ring S being provided with an ear by means of which the body 60' may be conveniently attached to a frame structure, as for example to the side view members of the chassis frame.

Another type of drip plug fitting is shown at D, and this is particularly useful for delivering lubricant in parallel to two bearings, at one of which, for instance, because of lack of room, it is not desired to directly apply a drip lug. In this relation, it will be seen that a drip plug structure 60' generally similar to that at C has a pipe thread 400 at the inlet or felt wad end thereof, rather than the cylindrical screw thread in the fitting at C, said pipe thread fitting into a corresponding socket 401 in a T fitting 402 by which it is carried. The T fitting may be a casting provided with an integral mounting lug 403 by which it is secured to the supporting structure and as shown, has a direct passage therethrough supplied from the pipe P and delivering to the drip plug structure. The integral stem 404 of the T fitting feeds through a pipe P² to some other bearing, the flow through said pipe controlled by an appropriate drip plug (not shown) in advance of or at a bearing (not shown) supplied therefrom. The outlet end of the drip plug body 60', as shown at D of Fig. 1 may be connected to the conduit 71 leading to a bearing $b^2$ by the coupling nut 74, the connection shown in Fig. 1 at D being substantially identical with that shown in Fig. 1 at C, said connection in Fig. 1 at C being indicated by the letter J.

At E, he has illustratively shown a fifth type of drip plug fitting, controlling the flow not only to the bearing $b^3$, at which it is mounted, but also that to a line 405 which may lead to some other bearing $b^4$. The construction shown comprises an elbow casting having a supporting stem 406 threaded into the bearing and provided preferably with an axial restriction pin 407 supported by a friction-fitted perforated cap 408 backed by a sheet 409 of metal mesh. The arm 410 of the elbow fitting has a restriction pin 410' held in place by means similar to that for retaining pin 407 in place. Into a well 411' at the back of arm 410 and coaxial therewith is threaded by a pipe thread as shown, a valve cartridge 411 preferably identical with the cartridge 32 of fitting A. Pipe P is connected by a coupling of the type shown at J to the inlet of cartridge 411 and a pipe 405 leading to another bearing is connected by a similar coupling to the end of restriction arm 410. In the compound drip plug fitting just described, it will thus be seen that when pressure is applied to the line, the valve in cartridge 411 will be forced open and lubricant will drip past the restriction determined by pin 407 to the bearing $b^3$ and in parallel and simultaneously therewith, past restriction 410' to and through pipe 405 to the bearing $b^4$ at the end of the latter.

As shown in the drawings, the restriction pins in all of the fittings described, preferably protrude beyond the ends of the bores into which they fit, so that the restriction crevice is of substantially uniform effectiveness from end to end of the restriction bore, where local variations in resistance might be incurred if the restriction pin were shorter than the bore therefor.

In the generalized system shown in Fig. 1, the drip plug restrictions are shown substantially at a common level. It is clear, however, from the foregoing description, and as will be further exemplified hereinafter that the system will operate successfully with the drip plugs extending in any directions whatsoever, and arranged at wide diversity of levels.

Obviously, the drip plug fittings although particularly intended to be operated in multiple could be connected to advantage for selective operation, one or more at a time.

*Automobile chassis lubrication*

The generalized lubricating system described in the foregoing has a specially desirable field of application in chassis lubrication.

Figure 2:
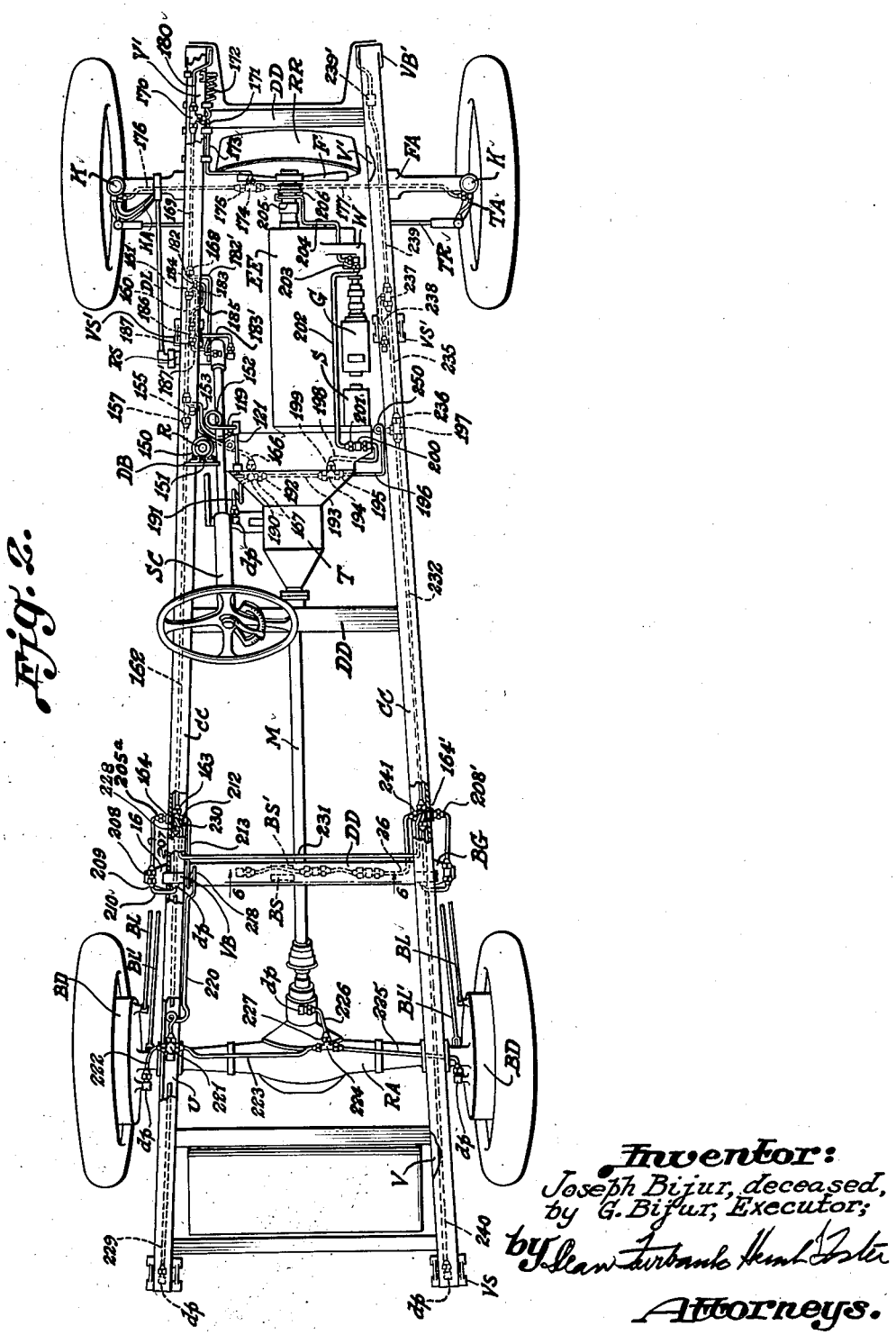
Fig. 2 is a diagrammatic plan of a motor vehicle showing the lubricating installation thereon.

In Fig. 2 is shown a substantially complete layout of a lubricating installation on a typical motor vehicle chassis. The chassis shown has a frame composed of longitudinal channel bars CC connected by cross-pieces DD and with an engine EE mounted thereon near the forward end. The engine has the usual accessory machines, such as the water pump W and the generator G, the engine starting motor S and the usual fan F which is back of radiator RR. Back of the engine are the clutch, operated by a pedal (not shown), the transmission box assembly T and the propeller shaft M driven therefrom and extending to the rear axle RA, upon which the rear end of the channel frame is sustained by interposed vehicle springs V hinged at their forward ends as at VB and connected at their rear ends to the back of the channel frames as by shackles VS. The forward axle FA stains the front end of the channel frame by interposed vehicle springs V', which are hinged at their forward ends at VB' and connected by shackles at their rear ends, as at VS'. The front or steering wheels are operated from the usual steering wheel at the upper end of the steering column SC, which is connected through rock-shaft RS on frame CC to operate the drag link DL, the latter connected at its forward end to the knuckle steering arm KA. The usual tie rod TR connects the steering arms KA and TA on the two knuckles.

The brake cross shafts BS and BS' which are mounted in lugs BG, protruding from opposite sides of the channel frame operate respectively through links BL and BL', the foot and emergency brakes (not shown) coacting with brake drums BD on the rear wheels, and said cross-shafts are, in turn, actuated by linkage (not shown) operated from the brake pedal and lever (not shown).

By the invention, lubrication is accomplished with a minimum of effort from one control station conveniently accessible on the vehicle, of all of the bearings upon the chassis whether on the unsprung axles or on the sprung chassis frame. Among the various bearings lubricated from the central source, as shown in the illustrative embodiment, are mounting bolts for the springs, the steering gear, the brake linkage, the clutch and brake shaft pedal bearings, the fan bearing, the king pin and the tie rod bearings.

The oil reservoir R shown in Fig. 2 is preferably secured as by a supporting strap 150 to the dashboard DB, the strap being drawn tight about the reservoir by a bolt 151.

The copper pipe 119 which connects the outlet of the reservoir to the pump 121 has extra length in the form of a loop 152 which facilitates making up the connecting unions and provides yield to accommodate without strain on the unions, any small relative displacements between the reservoir and the pump.

At, or in advance of each of the bearings on the chassis is located a suitable drip plug of one of the various types shown in Fig. 1, at A, B, C, D and E.

The reservoir may be located in a position convenient for filling, and where its contents may be kept fluid in cold weather by the heat from the engine. The pump is located in positions convenient for operation by a person at the driver's seat.

For distribution of the lubricant from the pump to the various bearings or drip plugs on the chassis, there is provided a system of piping including various dividing, branch or multiple outlet T, or cross fittings located at various parts of the vehicle which may serve the function, as is apparent, not only of distributing the lubricant but of positioning upon the vehicle, the pipe lengths connected therebetween.

In the illustrative embodiment shown, the pump outlet pipe 153 leads to the inlet nipple of a primary distributing fitting 155, which is bolted at the inside or concealed side within the channel CC. Each of the various other nipples of primary fitting 155 supplies a corresponding secondary fitting, each of the latter, in turn, leading through corresponding piping, in some cases directly to bearings to be lubricated, in other cases by way of further dividing fittings.

Figure 3:
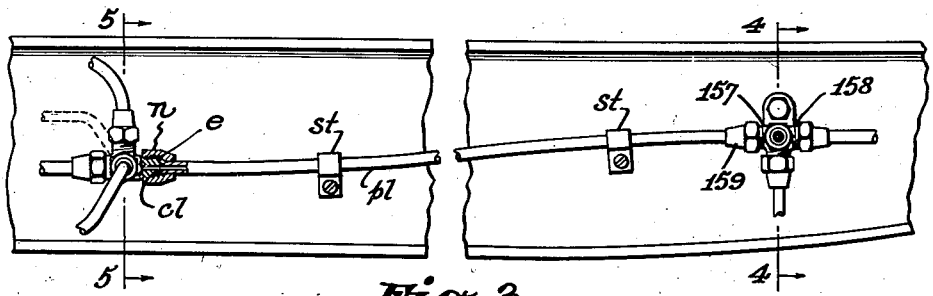
Fig. 3 is a side view on a larger scale indicating the construction and method of piping installation.
Figure 4:
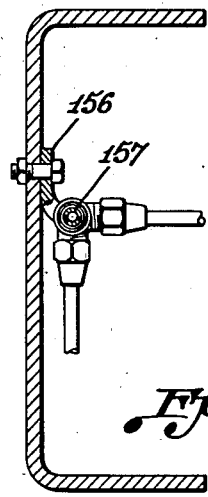
Fig. 4 is a sectional view taken along the line 4—4 of Fig. 3.

The construction and mounting of the primary fitting is shown apart in Figs. 3 and 4. As shown, the mounting lug 156 is integral with the fitting and its support engaging surface is offset laterally from the axial nipple or nipples 157 and 158 thereof, so that when mounted in the channel frame, ample room is left for application of a wrench to tighten the nut 159 for making up couplings of the type shown at J in Fig. 1. One of the nipples 158 of primary fitting 155 is connected to a pipe length 160 which leads forward to the rear nipple of fitting 161 on the channel frame. Another nipple of the primary fitting is connected to a pipe length 162 which leads rearward to the forward nipple 163 of a fitting 164, and a lateral nipple of the primary T fitting leads through the transverse length of the pipe 166 to fitting 167 on the engine. The advance nipple 168 of fitting 161 is connected through another pipe length 169 to the rear of a T, drip plug fitting 170 of the type shown at D in Fig. 1, near the forward end of the frame. The drip plug outlet of fitting 170 is connected to a length of pipe 180, the forward end of which extends through the mounting casting for the front spring bolt, to supply the bearing surface thereof. By this arrangement, he avoided placing the drip plug directly at the forward spring eye bolt, where it might be subject to injury.

The lateral nipple 171 of fitting 170 leads to flexible bridging piping 172 connected to front spring V' and near the forward end thereof, thence along the front spring V through a resilient pipe element or spring run 173 and along the axle to the stem 174 of a T fitting 175, mounted on the front axle. Pipes 176 and 177 longitudinally of the front axle are supplied from the lateral nipples of T fitting 175 and lead respectively to outlet fittings rigid with the axle and at the pivot axes of the left and right knuckles K, at which the lubricant is divided, to supply the various knuckle bearings, by a suitable arrangement, the details of which are not material, taken by themselves, to the invention claimed herein, and, therefore, not described.

Lateral nipples 182 and 183 of fitting 161 lead through pipes 182' and 183' to different parts of the steering gear. A branch outlet nipple 184 from the T fitting 161 leads through a pipe 185 to a dividing fitting 186 of the type shown at E in Fig. 1, the drip plug restriction (not shown) in the stem of which supplies lubricant to the upper bearing bolt of shackle VS' of the front spring, while the drip plug restriction in outlet arm 187 thereof is connected through a pipe 187' to supply a part of the steering gear. The shackle is preferably arranged to feed excess lubricant through an appropriate duct in one of the links thereof, from the upper to the lower bolt. This construction is not shown herein, as the details thereof, taken by themselves, are no part of the invention claimed herein.

The dividing fitting 167 which is secured to the flywheel housing and is supplied directly from the primary dividing fitting through pipe length 166, heretofore referred to, has a lateral outlet nipple 190 which leads through a pipe 191 to lubricate through a drip plug fitting dp of the elbow type, shown at A in Fig. 1, the clutch and brake pedal shafts (not shown). The other outlet of fitting 167 leads through pipe 193 to a T-fitting 194 also mounted upon the engine crank case. The lateral outlet 195 of fitting 194 leads through pipe 196 to T-fitting 197 on the right channel frame and communicating with the right main. A metal pipe 198 is supplied from the T-fitting stem 199 and leads to a drip plug fitting 200 of the type shown at B in Fig. 1, which is secured to the flywheel housing and lubricates the gear (not shown) of the starting motor S. The lateral outlet 201 of fitting 200 feeds lubricant through pipe 202 to drip plug fitting 203 at the water pump. Drip plug 203 is of the general type shown at D in Fig. 1, but has a lateral outlet nipple at right angles to the inlet nipple, and connected by pipe 204 to the shaft 205 of the fan, the copper pipe being looped as at 206 over the shaft to accommodate adjustment for the fan belt.

Figure 5:
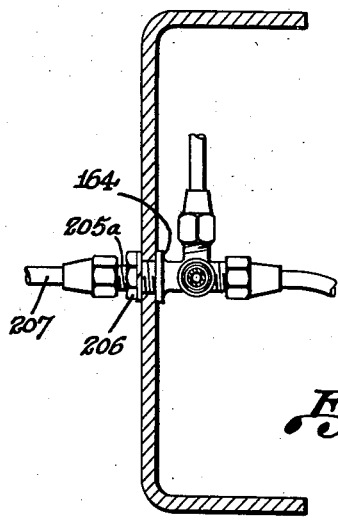
Fig. 5 is a sectional view taken along the line 5—5 of Fig. 3.

The dividing pipe fitting 164, as shown in the drawings, Figs. 2, 3, and 5 supplies lubricant to the bearing 16 for the brake cross shafts BS and BS' and at the exterior or exposed side of the channel frame. To avoid looping the conduit pipe under the channel frame for reaching the said bearing there is inserted the nipple 205a, which leads to said exposed bearing through a corresponding aperture in the channel frame, said nipple serving preferably also as the mount for the multi-nipple or dividing fitting 164 and dispensing in this case with the extra lug 156 used for mounting the primary and some of the other secondary dividing fittings. As best shown in Fig. 2 in connection with Figs. 3 and 5, the fitting 164 is of cross formation, and the mounting nipple 205a is clamped against the frame by a nut 206. The exterior pipe 207 is connected to the mounting nipple by a coupling of the type shown at J, and delivers through a fitting 208 of the type shown at B in Fig. 1, the restriction plug of fitting 208 delivering to the end bearings of the brake cross shafts at the lower side of which it is mounted. The lateral outlet 209 of fitting 208 is connected by a length of pipe 210 fixed by a coupling J to a drip plug dp having a pipe thread outlet to the front bolt VB of the rear spring to drip to the bearing surface thereof in the well understood manner.

A nipple 212 on fitting 164 is connected to a pipe 213 which supplies the rear axle, said pipe provided with a few helical turns 218 to the rear of and coaxial with the hinging bolt VB of the rear spring and extending lengthwise along the rear spring in a run 220. The rear end of run 220 leads to the stem of T-fitting 221 anchored to the rear axle RA. Pipe 222 from one lateral nipple of fitting 221 supplies the corresponding wheel bearing at an outlet or drip plug fitting dp. Pipe length 223 along the rear axle leads to T-fitting 224 anchored to said axle. One nipple of fitting 224 supplies the other wheel bearing through fitting dp at the delivery end of pipe 225 while branch pipe 226 from stem 227 supplies the differential pinion shaft bearing at a drip plug fitting dp. A nipple 228 on the cross-fitting 164 supplies the length of main 229 which leads rearward along the channel frame to supply the rear spring shackle VS.

Figure 6:
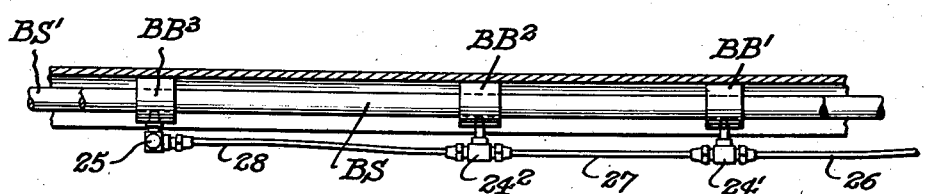
Fig. 6 is a sectional view on an enlarged scale taken along the line 6—6 of Fig. 2.

Nipple 230 on fitting 164 delivers to a transverse pipe 231 along a cross-bar DD, which leads to a cross-fitting 164' similar to fitting 164, and at the right-channel frame, and similarly connected through a mounting nipple 208' to lubricate the right end of the brake shafts and the rear shackle. The forwardly extending pipe 232 from cross-fitting 164' leads to pipe fitting 197, heretofore referred to. A length of pipe 235 from the forward nipple 236 of T-fitting 197 supplies the T-fitting 237, the lateral outlet of which leads through a length of pipe 238 to lubricate the shackle VS' for the front spring at the right hand channel frame through a drip plug terminal. The forward nipple of T-fitting 237 leads through a pipe 239 to supply the forward bolt VB' of the front spring through a drip plug 239' of the type shown at C in Fig. 1. Pipe 240 is connected to the rear nipple of fitting 164' and supplies the rear shackle of the right-hand rear spring, the parts having the same relation at the left channel frame. Nipple 241 of fitting 164' supplies lubricant to the intermediate bearings BB', BB² and BB³ of the brake cross-shafts BS and BS' in the manner apparent from Fig. 6 and from the description thereof below.

In the preferred mode of installation of the piping system briefly described, the various distributing fittings 155, 161, etc., would be initially mounted at their appropriate places upon the channel frames, axles, flywheel housing and other parts of the chassis, at appropriate holes provided for the purpose, and the various terminal drip plugs dp would be applied at or in advance of the various bearings at line terminals. As appears from the foregoing description, there are three broad types of distributing fittings. Dividing fittings in general such as at 161, are mounted by bolts through their mountings lugs of the type shown at 156. Fittings 164 and 164', one outlet of each of which leads to the exterior side of the channel frame may be mounted at said nipples, without extra mounting lugs, as previously described. Dividing fittings such as at 186 and 200 and which are contiguous to one of the bearings supplied therefrom and in the run of the pipe line, may be mounted by threading directly into the bearing, the line drip plug element of which constitutes the stem of the fitting as at B in Fig. 1.

The fittings being thus applied, the various connecting lengths of pipe would be mounted in position. Preferably lengths of copper or other bendable or soft metal seamless pipe of some elasticity is used. As best shown in Fig. 3, each pipe length pl is preferably positioned or located against endwise displacement by engagement of its previously flared ends e with the beveled clamping surfaces cl of the T nipples between which it is to be connected and is securely held after the couplings are made up by tightening the union nuts n to form the secure couplings of the type shown at J in Fig. 1.

Each length of pipe is then preferably stapled or clipped at intervals as at st, to the part of the vehicle structure along which it extends. Each length of pipe is, of course, somewhat longer than the distance between the nipples which it connects, the extra length being accommodated by curving the pipe between the nipples, the extra length permitting of bending the soft copper pipe about obstructions or other special conformations on the chassis frame or other part, and assuring secure connection of the couplings at both ends, moreover, accommodating the weaving or distortion of the chassis frame in use, without strain on the couplings.

For lubricating the intermediate bearings on the brake cross-shafts BS and BS', line drip plugs 24' and 24² of the type shown at B in Fig. 1 are mounted in the lower part of bearings BB' and BB². At the final bearing BB³ is mounted a terminal or drip plug 25 of the type shown at A in Fig. 1, lengths of pipe 26, 27 and 28 being then connected between the fittings, as shown. Oil is thus fed through a continuous line lengthwise of the cross-brake shafts, and tapped from said line at intervals along the length thereof to the bearings. The valves and restrictions of the line drip plugs are only in the taps to the bearings, so that each passes only the lubricant for the bearing to which it is connected.

In the transverse line across the engine, there are provided extra loops 250 in the short bridging portions near the channel frame, to accommodate the vibration of the engine relative to the frame. The loop 152 in pipe 119 connecting the reservoir and the pump, similarly accommodates any small relative displacement therebetween. Similar loops, not specially described are located in various pipe sections that connect parts subject to small relative displacement in use of the vehicle.

In the arrangement of Fig. 2, it will be seen that there are two cross-lines 196 and 231, one at the engine and one at the brake cross-shafts connecting the two mains. One cross-line is sufficient for satisfactory operation. With the arrangement shown, however, the effect of conduit-line pressure drop is substantially eliminated, the pressure at the drip plug or plugs most remote from the pump being substantially identical with that at the drip plug or plugs nearest the pump, when the latter is discharging.

By reference to Fig. 2, it will be noted that all piping terminals are disposed at parts that are rigidly attached to the frame axle, engine or other cross structure of the vehicle, so that the loosening or breaking strain on the pipes of couplings, is avoided, which might result, if a terminal were secured to a member performing even small rocking movements in operation, such as, for instance, the usual spring bolt.

It will be seen that the use of solder is avoided at the couplings for the pipe terminals. The soft copper pipe lends itself readily to flaring at its ends for making up the couplings shown at J in Fig. 1. The harder resilient brass pipes which are not readily flared are secured at their terminals by compression couplings.

The entire length of the distributing conduit or piping from the pump to each of the lubricating outlets or bearings, being non-dilatable pressure-tight metal pipe, preferably seamless, as heretofore set forth, even those flexible or resilient lengths that accommodate the relative movements between the chassis frame and the axles, the flapping, splitting and leak which may occur in the use of ordinary flexible hose to convey lubricant or fluid pressure from the chassis frame to the axles, is wholly obviated.

By reason of the extremely slow rate of oil propulsion in the preferred system described, very small pipes, as small as $\frac{3}{32}''$ internal diameter may be and preferably are used. Such pipes lend themselves with particular facility to bending around obstructions on the chassis frames, as heretofore indicated, and to formation into the hollow springs and the spring runs, heretofore set forth in detail.

The particular arrangement and distribution of dividing or distributing T and cross-fittings in Fig. 2 of the drawings, constitutes but one manner illustratively shown, in which a particular construction of vehicle can be fitted for centralized chassis lubrication. It will readily be understood that dividing fittings could be distributed at various parts, within the scope of the invention, of the chassis frame and axles in other manners that will readily suggest themselves to those skilled in the art.

The layout of piping exemplified in the foregoing is not limited to chassis lubrication, but certain of the features thereof are applicable more broadly to fluid or pressure distributing or transmitting arrangements generally as, for instance, for hydraulic brake or speedometer operation.

In its application for lubrication, the piping installation is of general application to various modes of lubricant propulsion whether by pressure, gravity, air-blast or other means. A pipe installation, such as that described, and especially the resilient parts thereof leading to the axles may also be employed as conduits for electric conductors leading to electric or electromagnetic apparatus on the axles, for instance, to be operated from a source of current controlled from the instrument board. A specific application would be to electromagnetically actuated oil or grease cups. It will also be seen that the electric conductors could be mounted unenclosed in conduits in the manner described.

The novel features of the pipe installation in their broader aspects are not limited in their application to motor vehicles, but may be employed in other relations, as for instance, for the lubrication of mechanisms generally, suggested diagrammatically in Fig. 1, such as textile machinery or printing presses, and for the lubrication of entire factory installations. Other applications within the scope of the invention, for transmitting pressure or fluid other than lubricant, will suggest themselves.

It will be seen that the operation of the system is equally effective, whether a multiplicity or only a few drip plugs are on the line; regardless of the application, whether for chassis lubrication or for the lubrication of stationary installations. In view of the fact that the check valves at the other drip plugs on the line, and the seated pump piston at the head of the line, prevent venting, it will be apparent that an injured or defective drip plug may be removed and replaced substantially with the same facility as an electric lamp on a domestic lighting circuit. For substantially the reason just set forth, should a pipe length or a drip plug become injured, the rest of the system will still operate. By simply pinching together the ends of a broken pipe length, the entire system will operate, as well as if it were intact, except, of course, that the bearing or bearings on the broken line beyond the break would receive no lubricant until the injury was repaired.

It is claimed:

1. In combination with a mechanism having structural members, a central lubricating installation comprising a distributing piping system having piping mains along each structural member, said mains being formed of a series of pipe sections which are simultaneously coupled together and supported upon said side members by junction fittings, said fittings being provided with suitable openings in integral portions thereof enabling bolting to the side members.

2. In combination with a mechanism having structural members carrying bearing structures, a central lubricating installation comprising a distributing piping system having piping mains along said members, said mains in part at least consisting of a series of pipe sections, which pipe sections are coupled together and simultaneously supported from the bearing structures by means of drip plugs provided with intercommunicating coupling heads.

3. In a central lubricating installation for a mechanism carrying bearing structures, a distributing conduit system leading to the bearing structures, flow metering instrumentalities associated with said conduit system to proportion lubricant among said bearing structures and a source of pressure connected to said distributing system, said flow metering instrumentalities being attached directly to those bearing structures that are in protected position and being positioned substantially away from those of the bearing structures that are in exposed position and connected to the latter by means of tail pipes.

4. In combination with a chassis having side and transverse members, a central lubricating installation comprising a distributing piping system, said piping system including a series of supporting junctions attached to said members and sections of piping coupled to and between said junctions, said piping sections being made of greater length than the distance of said junctions so as to afford a certain amount of flexibility which will accommodate weaving of the chassis body.

5. In a centralized system for lubricating a multiplicity of bearings on a mechanism frame, in combination, a source of lubricant, piping supplied from said source, including a main lengthwise of the frame, branch conduits supplied from said main and leading to said bearings in parallel, and pipe fittings connecting the heads of the several branches with the main, said fittings attached to the structure of the frame and constituting mounts for the main and for the heads of said branches.

6. In a centralized system for lubricating a multiplicity of bearings on a mechanism frame, in combination, a source of lubricant, piping supplied from said source and including a plurality of mains extending along the sides of the frame, each of said mains comprising a plurality of pipe lengths, pipe fittings connecting the ends of the pipe lengths of each of said mains in series, and constituting mounts for attachment of said mains to the frame, each of said pipe fittings having one or more extra nipples, and branch conduits supplied from said extra nipples and leading to bearings.

7. In a mechanism lubricating installation, in combination, a source of lubricant secured to the frame of the mechanism, a primary multi-nipple pipe fitting rigid with said chassis frame and supplied from said source, lengths of piping connected to nipples of said fitting, secondary multi-nipple pipe fittings connected at various points of the structure of the frame, each supplied at one of the nipples thereof from a corresponding one of said pipe lengths and pipe lengths connected to the remaining nipples of said secondary fittings and leading to bearings.

8. A pressure or fluid distributing piping system including a multiplicity of outlets in parallel from the system, some at terminals of the line and others in the run of the line, said piping including distinct lengths connected between consecutive outlet fittings and having coupling connections thereat, each line fitting being of T formation with a flow controlling outlet in the stem or branch thereof, and with pipe coupling connections at the arms thereof.

9. In a central lubricating installation, for a mechanism carrying bearing structures, a distributing conduit system leading to the bearing structures, flow metering instrumentalities associated with said conduit system to proportion lubricant among said bearing structures and a source of pressure connected to said distributing system, said flow metering instrumentalities being attached directly to those bearing structures that are in protected position and being positioned substantially away from those of the bearing structures that are in exposed position and connected to the latter by means of tail pipes.

10. In combination with a mechanism having structural frame members carrying bearing structures, a central lubricating installation comprising a distributing piping system having piping mains along said frame members, leading to said structures, said mains being formed of a series of pipe sections which are simultaneously coupled together and supported upon said side members by junction fittings and which are supported upon the bearing structures by metering fittings, said junction fittings being provided with suitable openings in integral portions thereof enabling bolting to the structural members and said metering fittings being provided with threaded connections to said bearing structures, one of said metering fittings including a pipe fitting having a pair of nipples in one plane, and a third nipple at right angles to each of said pair of nipples, said third nipple having lubricant outlet means at its end and having in the interior thereof a highly restricted lubricant-flow controlling passage, and a valve in said fitting operating under pressure applied through one of the nipples for passing lubricant through the other nipples.

11. In combination with a mechanism having structural frame members carrying bearing structures, a central lubricating installation comprising a distributing piping system having piping mains along said frame members leading to said structures, said mains being formed of a series of pipe sections which are simultaneously coupled together and supported upon said side members by junction fittings and which are supported upon the bearing structures by metering fittings, said junction fittings being provided with suitable openings in integral portions thereof enabling bolting to the structural members and said metering fittings being provided with threaded connections to said bearing structures, one of said metering fittings including a pipe fitting having three nipples protruding therefrom, one of said nipples having in the interior thereof a highly restricted lubricant-flow controlling passage and a valve in said fitting operating under pressure applied through another of the nipples for passing lubricant through the remaining nipples.

GEORGE BIJUR,
*Executor of the Estate of Joseph Bijur, Deceased.*